(12) United States Patent
Chen et al.

(10) Patent No.: US 11,048,766 B1
(45) Date of Patent: Jun. 29, 2021

(54) AUDIENCE-CENTRIC EVENT ANALYSIS

(71) Applicant: Facebook, Inc., Menlo Park, CA (US)

(72) Inventors: Songting Chen, San Jose, CA (US); Ping Chen, Cupertino, CA (US); Purbesh Sahoo, Sunnyvale, CA (US); Yi Cheng, Fremont, CA (US); Ruichao Qiu, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 379 days.

(21) Appl. No.: 16/019,378

(22) Filed: Jun. 26, 2018

(51) Int. Cl.
| G06F 17/30 | (2006.01) |
| G06F 16/9535 | (2019.01) |
| H04L 29/08 | (2006.01) |
| G06F 16/901 | (2019.01) |
| G06Q 50/00 | (2012.01) |

(52) U.S. Cl.
CPC ...... *G06F 16/9535* (2019.01); *G06F 16/9014* (2019.01); *H04L 67/22* (2013.01); *G06Q 50/01* (2013.01)

(58) Field of Classification Search
CPC ... G06F 16/9535; G06F 16/9014; H04L 67/22
See application file for complete search history.

(56) References Cited

U.S. PATENT DOCUMENTS

| 10,706,450 B1 * | 7/2020 | Tavernier | G06Q 30/0625 |
| 2009/0124241 A1 * | 5/2009 | Krishnaswamy | G06N 20/00 455/414.2 |
| 2009/0125321 A1 * | 5/2009 | Charlebois | H04L 67/20 705/346 |
| 2009/0187939 A1 * | 7/2009 | Lajoie | H04N 21/25883 725/34 |
| 2010/0205541 A1 * | 8/2010 | Rapaport | G06F 16/285 715/753 |
| 2014/0101147 A1 * | 4/2014 | Foody | G06F 16/243 707/729 |
| 2014/0310058 A1 * | 10/2014 | Aral | G06Q 30/0269 705/7.29 |
| 2015/0149879 A1 * | 5/2015 | Miller | G06F 16/2477 715/226 |
| 2016/0379231 A1 * | 12/2016 | Sheppard | G06Q 30/0204 705/7.33 |
| 2017/0091794 A1 * | 3/2017 | Sheppard | G06Q 30/0204 |
| 2017/0353477 A1 * | 12/2017 | Faigon | G06F 21/6209 |
| 2018/0129744 A1 * | 5/2018 | George | H04L 67/02 |
| 2018/0267947 A1 * | 9/2018 | Miller | G06F 16/2477 |

* cited by examiner

*Primary Examiner* — Huawen A Peng
(74) *Attorney, Agent, or Firm* — Fenwick & West LLP

(57) ABSTRACT

A database search method combines SQL command, complex event processing, and keyword search. Event data records may be collected based on the events specified in a query. A complex event processing analysis is used to determine the records that meet the correct sequence of events. The keyword search is used to filter user data records that have the attributes specified in the query. A SQL command may be used to further analyze or group the data records found. One or more metrics of the filtered results are presented as the result of the query. To run a new query efficiently, user identifiers are distributed using hashes. Adaptive sampling is used to determine whether the search result is within a desired margin of error. An efficient search for a specific condition is performed using a pace computation that jumps into a location of user data records that have the attributes.

20 Claims, 9 Drawing Sheets

| Female | 256 | 260 | 262 | 264 | ... | ~310 |

| Age = 28 | 256 | 264 | 280 | 292 | ... | ~312 |

| Age = 29 | 260 | 262 | 312 | 351 | ... | ~314 |

| Interested in Cars | 256 | 262 | 281 | 345 | ... | ~320 |

| Interested in Video games | 260 | 280 | 281 | 406 | ... | ~322 |

| Interested in Baseball | 260 | 272 | 458 | 670 | ... | ~324 |

Events_At_Online_Store_A:

| User Hash | Timestamp | EventType | Item ID | ... |
|---|---|---|---|---|
| 260 | ts1 | Event A | 324235 | ... |
| 260 | ts2 | Event A | 446849 | ... |
| 260 | ts3 | Event C | | ... |
| 264 | ts4 | Event B | | ... |
| 270 | ts5 | Event B | | ... |
| ⋮ | ⋮ | ⋮ | ⋮ | ⋮ |

330

AUDIENCE-CENTRIC EVENT ANALYSIS

BACKGROUND

This disclosure relates generally to a query operation, and in particular to a query operation that recognizes various event sequences and data attributes in complex databases and returns metrics that summarize the operation result.

Many online systems, such as social networking systems, serve as common platforms for users to connect, interact, and communicate with others. Users of an online system may create user profiles that include their information, such as their demographic information. An online system often stores data relating to the user profiles as well as other types of data associated with the users, such as data recorded when activities are performed by the users in the online system. To provide better contents to the users, an online system may perform data analysis of user attributes identifiable in those stored data to determine whether a content item should be presented to the users.

When an online system is a large-scale one, such as a massive social networking system that includes billions of users, identifying user attributes in different databases has become a challenge for at least several reasons. First, user data are often scattered in different databases and indexes. Data structure of user data and associated event data has become rather complex. As a result, conventional data processing techniques are inefficient to analyze data in many online systems. Second, the amount of data in some online systems have also become so enormous that even state of the art processors might not be fast enough to handle a massive amount of search. Third, although activities of users can be captured by the online system, conventional data processing techniques are often inadequate to meaningfully process those data associated with user activities.

SUMMARY

Embodiments described herein relate to a query operation that allows a searcher to provide a query that specifies different types of attributes and conditions that are normally difficult to combine. For example, the searcher in the query may specify certain event sequences combined with attributes of users. Conventionally, responding to this type of query is challenging because the users identified by the event sequences may have different user attributes. Yet, the data structure of a particular user could be very complex because the user attributes may be separately stored in many different databases and indexes. The processing of data that involve different sources and different data types (e.g., event sequences and user attributes) is even more challenging when the amount of data points is massive. In accordance with an embodiment, a search module of an online system performs different types of operations to identify, collect, and filter data records that match the conditions and attributes specified in the searcher's query. This method allows a system to perform data processing that combines analysis of event data and filter of user attributes that are stored in different databases.

The data of an online system are often stored in one or more databases. The access of the data conventionally requires the use of data management programming languages such as SQL (structured query language) or some variations of SQL. Although SQL provides some important tools for performing data analysis and processing (such as slice and dice), SQL commands are inadequate in many situations that involve big data. For example, user attributes of an online system can take the forms of user demographic data, post history, user connections, behavior data, etc. Since there are different types of user attributes that may be generated in different sources, time, and occasions, user attributes are stored in different databases in often reverted index forms. Given that the data structure of a single user is already rather complex, the data structure of the entire population of millions or even billions of users in some massive online systems is extremely complex. SQL commands are inadequate to handle such data processing.

Embodiments described herein solve those problems by performing keyword searches to locate lists of user attributes specified in a searcher's query, conducting complex event processing (CEP) analysis on event data, and filtering results of the event data using the keyword searches. Specifically, a method in accordance with an embodiment includes receiving a query that specifies one or more conditions of one or more user attributes and of one or more event sequences. In response, the search module of the online system collects a subset of user data records by a keyword search operation based on an audience filter specified in the query. The collection process includes sampling user data records from a population and performing one or more keyword searches to identify sampled user data records that satisfy the specified conditions of the user attributes. The search module of the online system also collects multiple event data records that match the events in the query. Using CEP analysis, the search module identifies a subset of event data records that not only match the events, but also satisfy the event sequences specified in the query. The search module compiles a combined set of data records from the subset of user data records and the subset of event data records. For example, the search module selects data records associated with users that are present in both subsets. A confidence level of the combined set is determined. The sampling and search processes may be expanded if the confidence level that the combined set of data records correctly represents the population is below a target level. One or more metrics of the subset of combined data records can be returned as the search result.

The operation described herein allows a searcher to use a novel query language to find out common attributes or metrics of a group of users whose behaviors are captured by certain sequences of events. By way of a specific example, in determining targeting specifications (targeting specs) of audience in providing content items, a content item provider may specify certain behaviors of interests in the form of event sequences (such as querying for users who have browsed promotional pages before completing a purchase at a certain online store) and further require that the target audience be female and in age between 20 and 30. The online system, based on this query and using the operation described herein, returns a result that can include metrics of attributes of those past customers who satisfy all of the conditions in the query. The metrics may identify those customers' common characteristics, which can be used as part of the targeting specs of the target audience.

It should be noted that embodiments described herein have wide applications in other fields and are not limited to target content item delivery.

BRIEF DESCRIPTION OF THE DRAWINGS

FIGS. 3A and 3B illustrate example user attribute inverted indexes, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overall System Environment

Figure 1:
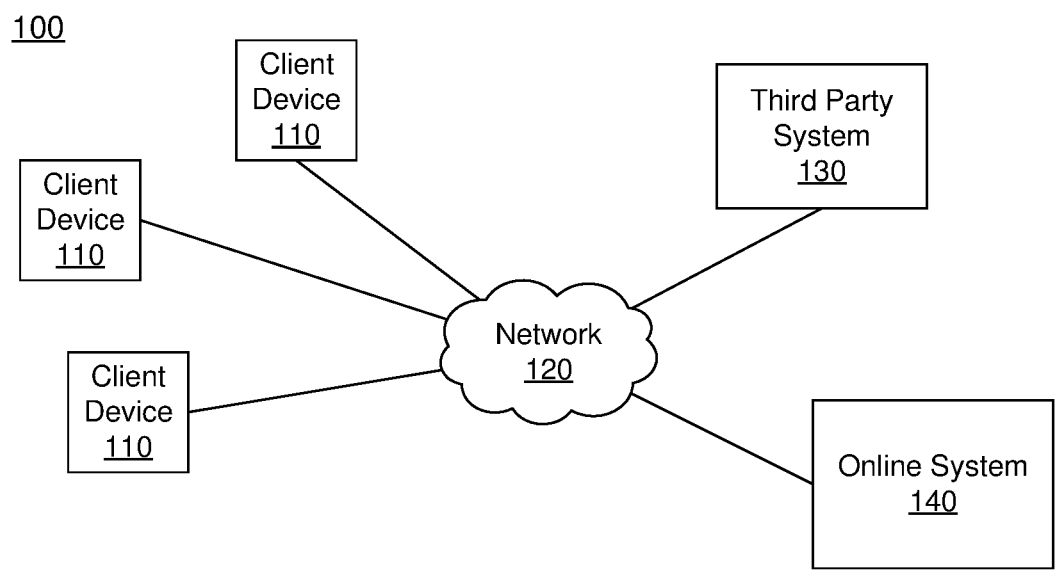
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. A client device 110 may also interact with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as sponsored content items (e.g. advertisements), content, or information about an application provided by the third party system 130. The third party systems 130 may also interact with the online system 140 through an open API or, in some cases where the third parties have certain specific access privilege of the online system 140, a private API.

Figure 2:
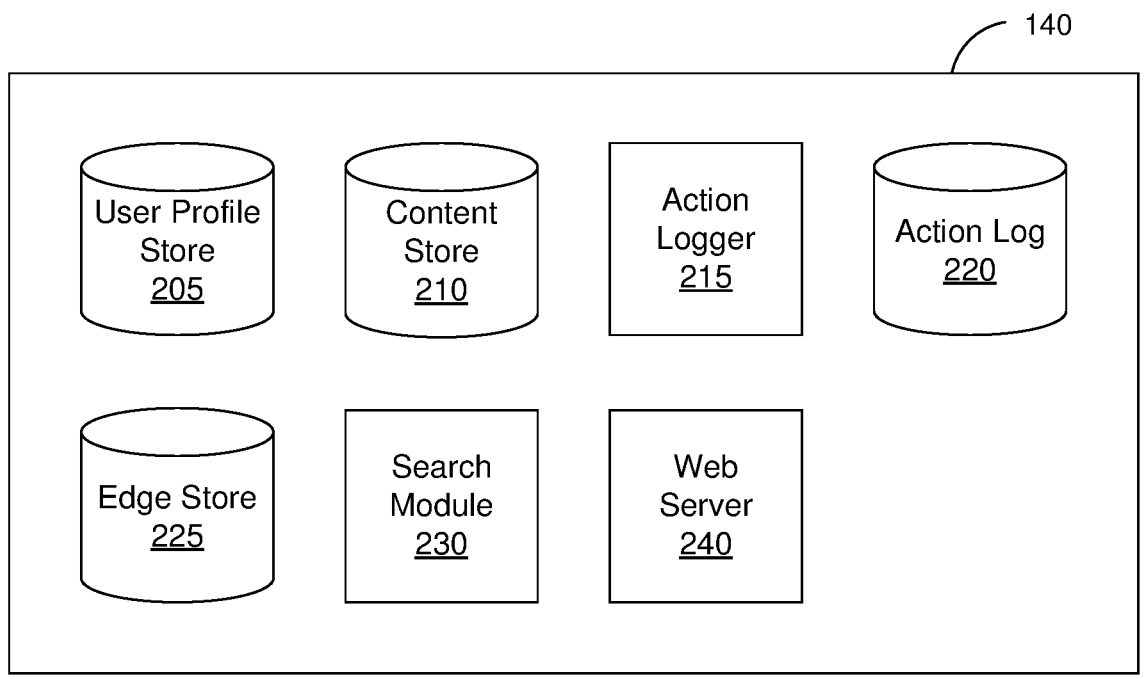
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a search module 230 and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with sponsored content items on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, sponsored content items that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The data stored in the user profile store 205, the content store 210, the action log 220, and/or the edge store 225 may be stored in one or more database management systems that are accessible using data management programming languages such as SQL (structured query language), variations of SQL, and/or any other similar relational database programming languages. Examples of relational database systems include MySQL, SQL Server, Microsoft Access, Oracle, Sybase, Informix, Postgres, etc. For simplicity, things related to a relational database may be referred with the term SQL but those skilled in the art would understand that the relational database described here may use other relational database formats and standards.

Each data record stored in online system 140 may be stored in data tables or indexes such as inverted indexes. A user is often associated with multiple records stored in different indexes located in different databases. For example, data of the user's profile related to attributes such as demographics are stored in the user profile store 205 while data of the user's connections are stored in the edge store 225.

The search module 240 performs searches of different databases in the online system 140 and returns search results, which may be in the form of metrics that provide statistical information of the data records. In some cases, the search module 240 may also return search results that include users having certain similar attributes, such as in a certain age group, from the same geographical area, and sharing the same interests. The search module 240 may also return search results for the online system 140 based on certain sequences of events. For example, the action log 220 may include data records of certain events that are associated with different time stamps. The search module 240 analyzes those events and returns data records that match the sequences of events specified by a query. For example, in response to a sponsored content item request with certain targeting specs that specifies attributes that define who sees the sponsored content item, the search module 240 performs a search that identifies the user attributes and user action event sequences that match the specified attributes in the targeting specs.

The search results returned by the search module 240 may be in different formats depending on the requestor of the search. A search may be initiated internally by an employee of the company operating the online system 140 or externally by a client or a third party through an interface such as API. Depending on the access privilege of the person or entity that requests the search, different levels of details are provided as the result of the search. For example, in response to an internal employee having a high level of access privilege performing a search through a secure company account, detailed data including actual data point values may be returned by the search module 240 as the search result. In response to a search initiated by as an indirect result of an open API request, the search module 240 may only provide metrics summarizing the searched data records without disclosing any actual data values to the entity using the API.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Database Structure and Examples

FIGS. 3A and 3B are example inverted indexes that associate different user hashes with user attributes. An inverted index is a list that is associated with a user attribute and the user hashes that represent the users who have the user attribute. The user profile store 205, the content store 210, the action logger 215, and the edge store 225 each may include multiple user attribute lists, each of which are associated with different user hashes.

The user attribute lists 310, 312, and 314 in FIG. 3A provide examples of how users are associated with user attributes in the online system 140, in accordance with some embodiments. FIG. 3A currently shows three inverted indexes, but a database may include a large number of inverted indexes. List 310 is used to associate user attribute "Female" with different users. Instead of the user identifiers (ID), user hashes of the user IDs may be used to store and sort the users among a user attribute list. A user hash is a unique numerical representation of a user identifier (ID). For example, a user ID "Albert108" may be mapped to a user hash "65491305." For a large-scale online system 140 such as a massive social networking system, there can be a large number of user attributes. Also, each user attribute list may include any number of user hashes, from zero to potentially billions of user hashes. The total databases of such large-scale online system 140 can be classified as big data.

There can also be thousands or even millions of user attributes, including demographic data, interests, connections, actions, posts, content items that are stored in different databases. For example, lists of user attributes related to users' demographic data are stored in the user profile store 205, lists of user attributes related to users' interests are stored in the content store 210, etc. The lists 320, 322, and 324 shown in FIG. 3B illustrate examples of another kind of user attributes, which are related to user interests. Each user interest (e.g., car, video games, baseball) is associated with multiple user hashes that represent unique users.

Figure 3C:
FIG. 3C is an example event data table, in accordance with an embodiment.

FIG. 3C shows an example of an event data table 330 that is used to store event data. The data table 330 stores different event data records that occurred at "Online Store A" with data being sorted by the user hashes and also by timestamps. Besides user hash, timestamp, event type, the data table 330 may also store other fields such as item ID, etc. A timestamp represents the time at which each event occurred. The events can be different actions taken by users. For example, in one case "Event A" is "added to cart", "Event B" is "visited a certain promotional page", and "Event C" is "completed purchase". Hence, a user with a user hash "260" added an item with the item ID "324235" to cart, added another item with the item ID "446849" to cart, completed the purchase of the items, but did not visit a promotional page of the Online Store A. Other users with user hashes "264" and "270" visited the promotional page.

Event data are associated with different event types. Each event data table may be associated with a particular location, store, date, and/or any other classifier that determines how an event is stored in a particular event data table. Other attributes of event data may include users' impression clicks, offline store visits, mobile app events, website events, page engagements, posts, etc.

It is often infeasible to use a SQL engine to query both inverted indexes and database tables. Instead, in an embodiment, to identify users that satisfy certain attributes, a keyword-based search is used to locate proper user attribute inverted indexes. For example, a search expression "(and female (or interested_in_car interested_in_finance)" may be used to locate user attributes in inverted indexes "female", "interested_in_car", and "interested_in_finance." The users that satisfy the entire search expression are then selected based on the Boolean expressions (e.g., and, or, etc.) specified in the search expression.

By using a keyword-based search, the user attributes can be used to filter a selected set of users that satisfy certain criteria. Events of those users are identified and processed through complex event processing (CEP), group by, and other SQL commands. A query optimizer may be used to decide if the keyword-based search should be executed first or events should be processed first based on the volume of data. The details of a query that combines keyword search, CEP, and SQL will be further discussed in FIG. 4.

Query Structure and Method

Figure 4:
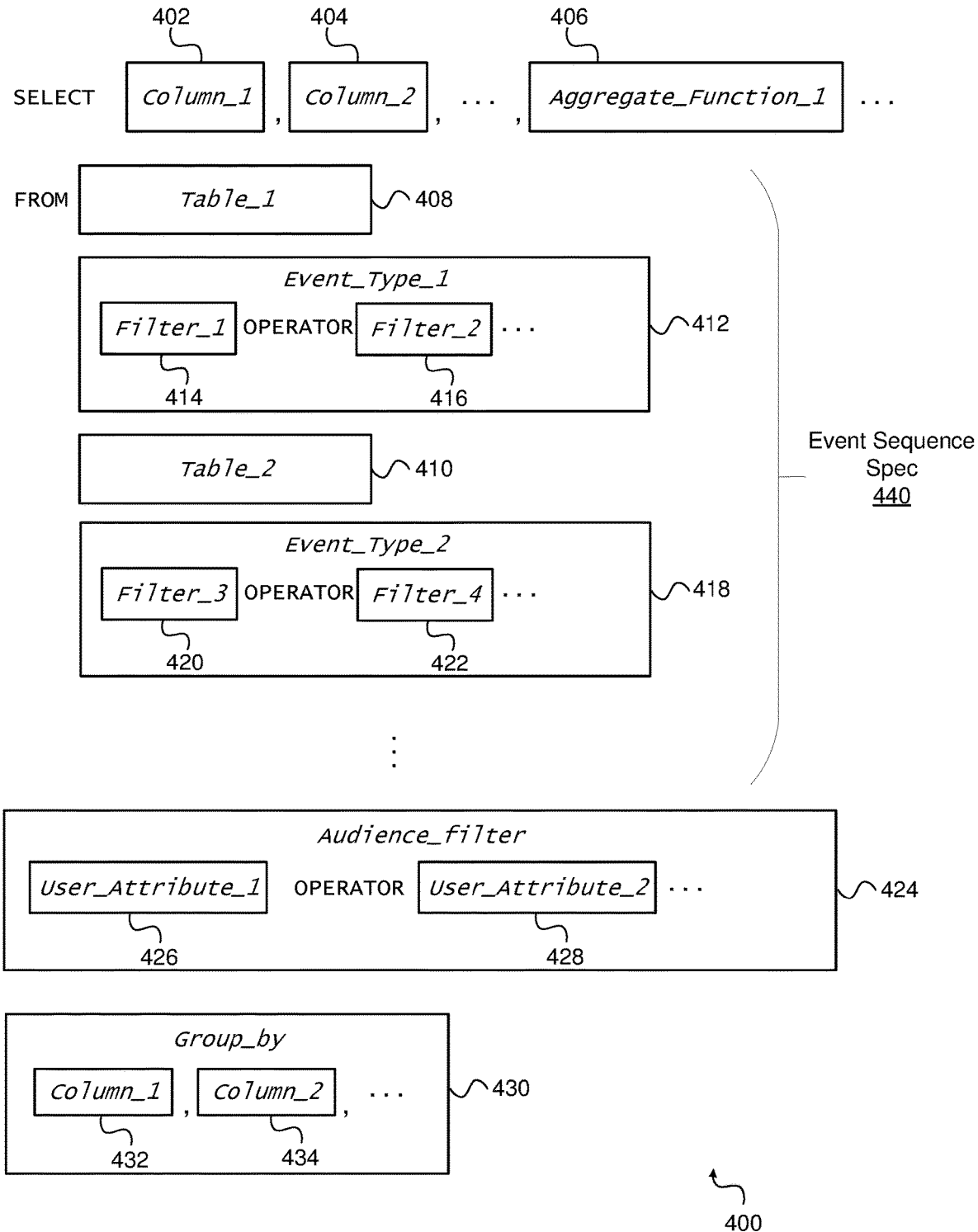
FIG. 4 illustrates an example query language, in accordance with an embodiment.

FIG. 4 illustrates an example query 400 of a query language, in accordance with an embodiment. Operations in response to the query 400 can be performed by a module of the online system 140, such as the search module 230. This query 400 includes the use of SQL commands, complex event processing (CEP) commands, and audience filter in the form of keyword searches together. It should be noted that all lines in FIG. 4 can represent a single query that allows the searcher to specify attributes and conditions of the attributes.

In FIG. 4, rectangular boxes represent various attributes that a query may specify while other words outside the rectangular boxes represent the syntax and structure of the query language. The words used in query 400 are examples only and may be replaced by other words. For example, in different variations of the query language, the words in the query as defined by the syntax may be replaced by other words, depending on the implementations and variations of the syntax. The term "OPERATOR" is a generic term that can be replaced with common operators that are used to define different conditions. For example, the term "OPERATOR" may be "and", "or", "diff", "xor", etc.

In the first line, the "SELECT" command is used to specify columns from user attributes and event attributes. For example, Column_1 402 may be "age", Column_2 404 may be an event type. The "SELECT" command may also be used to specify different aggregation functions that are used to provide metrics of the returned data. A metric represents a statistical value of the searched data records such as the total number of distinct data records found, average value of a certain attribute, standard deviation, ranges, etc. For example, Aggregate_function_1 406 can be "sum(value)," "count(distinct user_id)," etc. There can be more or fewer than two columns/aggregate functions that follow the "SELECT" command, as represented by the ellipses following the Column_2 404 and the Aggregate_Function_1 406.

In the second section, the "FROM" command defines one or more data tables 408 from which event data are collected. For example, a query may use "FROM Events_At_Online_Store_A" to specify that the search module 230 should collect a set of data records from event data table 330 in FIG. 3C. It should be noted that Column_1 402, Column_2 404, etc. do not have to be columns of the data tables specified in Table_1 408 or Table_2 410 because, as discussed in more detail with audience filter 424 below, the search module 230 collects data from different sources, even though only a handful of data sources, such as Table_1 408 and Table 2, are explicitly specified in the query 400 in the "FROM" section.

After the "FROM" command, the query 400 may include CEP and filter commands. For example, the query 400 may specify the types of events 412 and 418 and event filters that specify different attributes that data records in the data table 408 or data table 410 need to satisfy. Different types of events (such as pixel, page engagement) can be specified and the types of events may or may from come from one data table. For example, data associated with Event_Type_1 412 may reside in a first event data table Table_1 408 while data associated with Event_Type_2 418 may reside in a second event data table Table_2 410 that is specified in later lines of the "FROM" section.

For each event types 412, 418, etc., one or more event filter may be specified to further select the events. Event_Type_1 412 may include Filter_1 414 and Filter_2 416 joined by an operator while Event_Type_2 418 may include Filter_3 420 and Filter_4 422 joined by another operator. The filters in an event type specify the attributes of the events that satisfy the query. Here, an event type is a generalized term for a type of actions or occurrences. An event attribute is a characteristic of the event type for a particular event. For example, an event type can be "Purchase" while the filters 414, 416, 420, 422 may specify the attributes (e.g. "value>$100," "in last 90 days," etc.) of different occurrences of "Purchase."

The entire "FROM" section together forms one or more event sequence specifications 440. A particular event sequence specification defines the event sequence of interest. For example, a particular event sequence specification defines that Event_Type_1 must be followed by Event_Type_2 to satisfy the query 400. The event sequence specification may also specify the number of occurrence of each event in a sequence. For example, a query 400 may specify "visiting a particular website" 5 times before an occurrence of "purchase." The number of occurrences is specified in one or more of the filters 414, 416, 420, 422. For example, a filter may include "count(3:5)," which specifies the number of occurrence of the event is between 3 and 5.

The next section of the query 400 is an audience filter 424 that specifies the user attributes used to filter the users associated with data records collected from the event data specified in the "FROM" section. Here, an attribute may refer to a user's characteristic in the form of a data point. For example, age 29 is an attribute of a user associated with the user hash "260" in inverted index 310. A condition of the attributes refers to the relationship of the attributes specified in the query. For example, the condition can be "and", "or", "xor", etc. and is often specified using one or more Boolean operators. When there is only one attribute specified, the condition of the attribute can either be positive or negative (i.e. not the attribute).

For example, the User_attribute_1 426 in the audience filter 424 can be "age=20" and User_Attribute_2 428 in the audience filter 428 is "gender=female." One or more operators are used to define the conditions among the user attributes. In addition to searching the data tables 408 and 410 specified in the "FROM" section, the search module 230 uses the keywords specified in audience filter 428 to search through user attributes lists (e.g., those shown in FIGS. 3A and 3B) to collect data satisfying the attributes and conditions specified in the audience filter 428. Hence, even though only a few event data tables are specified in the "FROM" section, other sources of data are also searched by the search module 230. For instance, the Table_1 408 may specify an event data table that contains events of interest. The audience filter 428 may specify different user attributes. Based on such query 400, the search module 230 automatically search both event data tables and user attribute lists. The audience filer is used to filter the event data records collected from event data tables such as Table 1 408.

The last section of the query 400 includes one or more Group_by commands 432 or other SQL commands that are used to specify how the searched result is presented to the user. The Group_by command 432 may include one or more columns 432 and 434 that specify how the result is organized.

The following is an example of a query written in the format of query search 400 in accordance with some embodiments:

SELECT age, gender, event_name, count(distinct user_id)
    FROM Sequence{
    source: 'app_events_123'
    WHERE ({field: 'event', value: 'ViewContent'} and {field: 'url', value: 'food'} and {field: 'count', value: '3:5'})
    source: 'pages'
    WHERE ({field: 'event', value: 'comment' or 'like' or 'share'})
    }
    AUDIENCE FILTER (difference (and female (or auto intender interests:car)) existing_customer)
    GROUP BY age, gender, event_name The above example query specifies the output result of the query 400 to include age, gender, event name and the total count of distinct user ID. The event sequence specification 440 in the above example in the "FROM" section specifies two event data tables 'app_events_123' and 'pages'. The query also specifies two types of events. The first type is the event type "view content" in 'app_event_123' and the second type is 'comment', 'like', or 'share' in 'pages.' The first type of event 'view content' is also further filtered by 'url' and 'count.' The users identified in the event sequences are further filtered by the audience filter specifying that the users must be female or someone who are interested in cars but exclude the existing customers. Lastly, the output result is grouped by age, gender and event name associated with the users. In sum, the query searches for female new customers who are interested in cars and who view content related to food three to five times in the 'app_events_123' before the customers comment, like, or share a food webpage.

In response to such search queries, the search module 230 collects, in the specified event data tables, event data records that include any of the events specified in the query. The search module 230 then uses the CEP to determine which event data records match the specified sequences of events. The search module 230 also uses keyword searches to locate different user attribute inverted indexes. The user data records that satisfy all of the conditions specified in the query are joined from different inverted indexes. The user data records found are then used to filter the event data records. Alternatively, the search module 230 may use keyword searches first to conduct the audience filter before the search of event data records specified in the event sequence. A query optimizer may be used to determine whether event sequence or audience filter is executed first based on the size of data.

Query Plan

Figure 5:
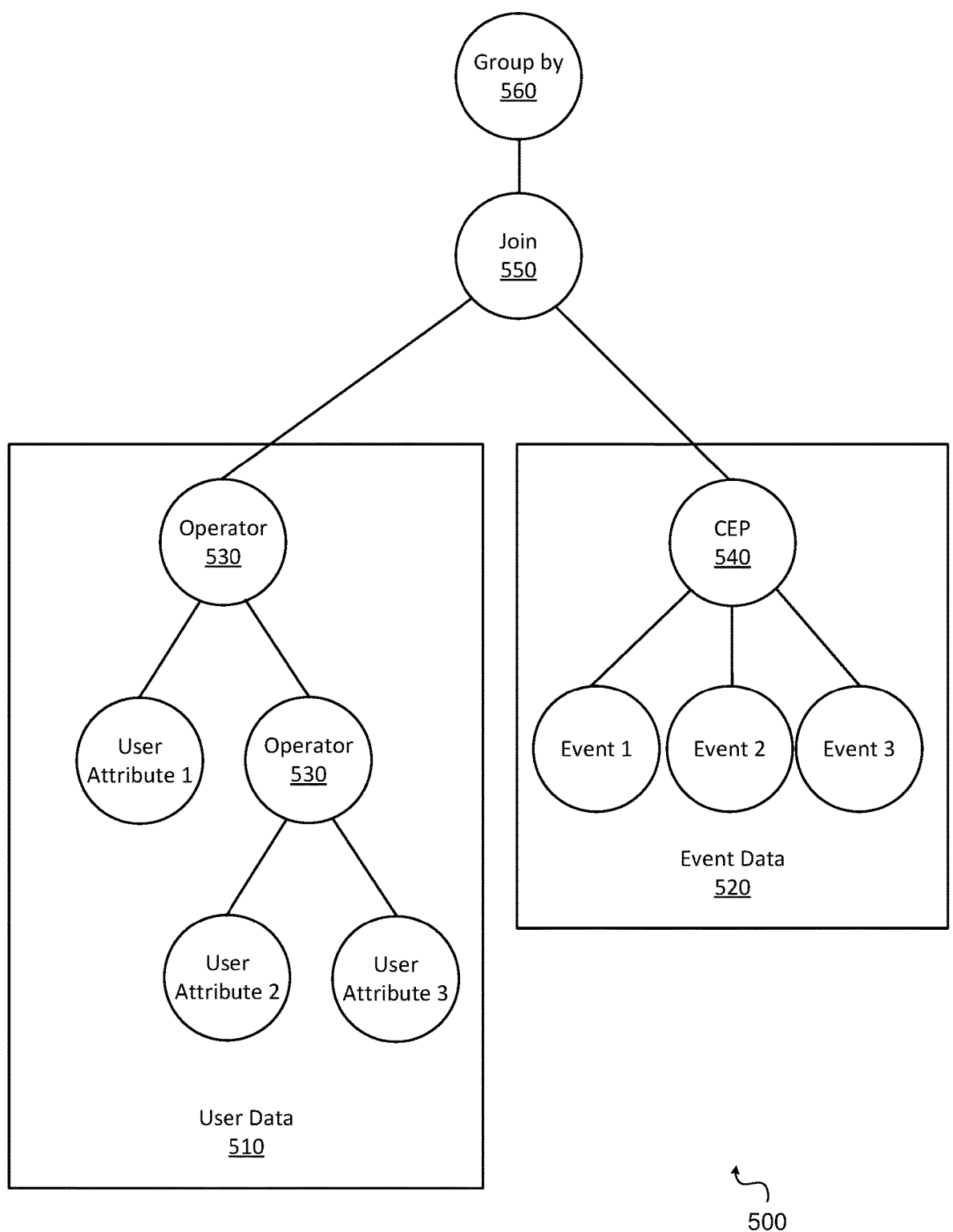
FIG. 5 is a block diagram illustrating an example query plan, in accordance with an embodiment.

FIG. 5 illustrates an example query plan 500 in accordance with some embodiments. In response to a query, the search module 230 collects two subsets of data records from two sources, the user data 510 and the event data 520. The collection of a subset of user data records 510 is an operation of audience filter that can be performed through keyword searches based on different user attributes and the conditions set forth in one or more operators 530. The collection of a subset of event data records 520 is an operation based on event sequence specification that can be performed by specifying data tables and including event sequences. The specification of the event sequences is examined by CEP 540 to determine whether the event data records collected conform to the sequence of events specified in a query. After the two subsets of data records are collected, a join operator 550 combines the subset of user data records 510 and the subset of event data records 520. Filtering and compiling of combined data records are performed using the join operator 550. After a final subset of combined data records are identified, a group-by command 570, an aggregation command, and/or other SQL commands can be used to arrange the final subset of data records for presentation. Hence, the search module 230 returns a search result that includes data of a group of users with the characteristics of those users. In some cases, the search result may also be in the form of metrics that statistically summarize the subset of the combined data records. For example, one metric may be the average age of the users identified.

It should be noted that the collection of the user data 510 and the collection of event data 520 can occur in any order. The search module 230 may include an optimizer to decide which part of the collection should be executed first based on the size of data.

Complex Event Processing

Figure 6:
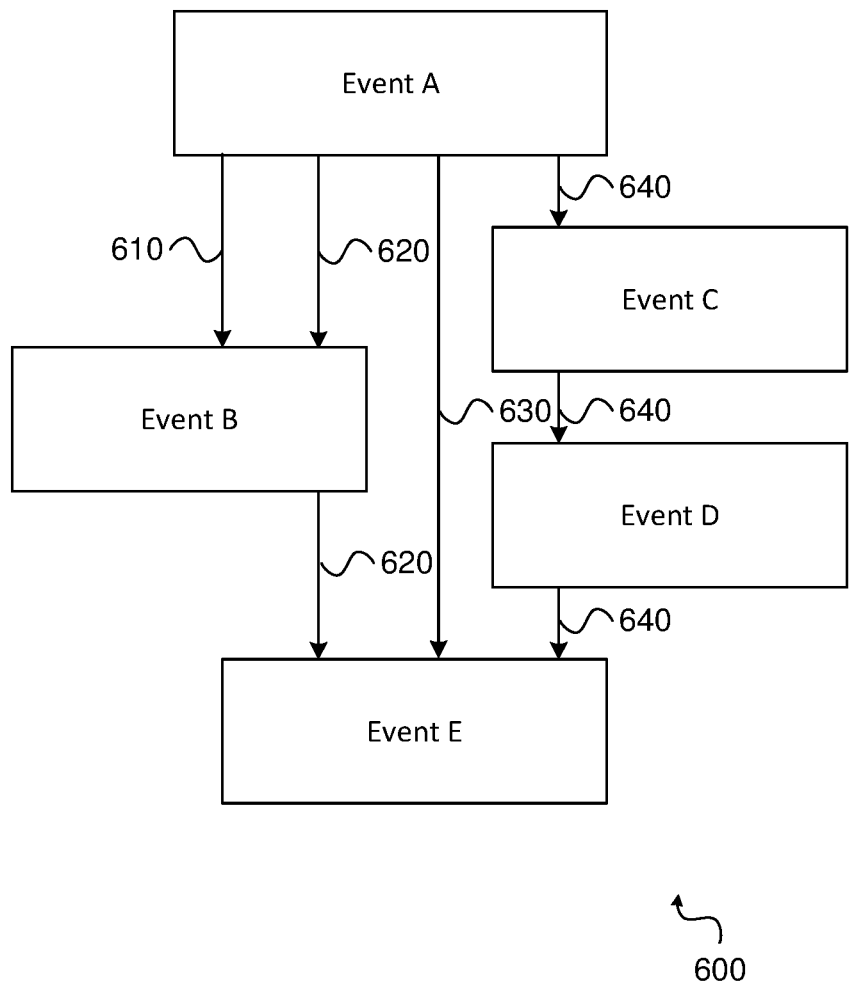
FIG. 6 is a block diagram illustrating a complex event processing analysis.

FIG. 6 illustrates a block diagram 600 that represents a process of a complex event processing (CEP) analysis in accordance with some embodiments. An event data table stores different event data records. Information related to the sequence of the events may also be stored in a data table in different ways. For example, the occurrence of each event can be associated with a time stamp that is stored in a data table. The events can also be stored chronologically in an event table. The block diagram 600 includes four routes 610, 620, 630, and 640 that respectively represents a different event data record that has a different event sequence. For example, the route 610 represents an event data record that includes an occurrence of event A followed by event B. The route 640 represents an event data record that includes an occurrence of event A, event C, event D, and event E in a chronological order. Specifically, the block diagram 600 may represent possible event sequences monitored by an online store that is associated with the online system 140. Events A, B, C, D, and E may respectively represent "added to cart", "performed additional product browsing", "visited a promotional page", "entered a promotional code", and "completed a purchase". Hence, event data records that satisfy route 610 represent an event sequence in which a user added an item to cart then continued to browse additional products but eventually decided not to make a purchase. Route 620 is similar to route 610, but the users completed a purchase. It should be noted a query may specify that an event in a route may occur more once. For example, by using an event filter, a query may specify that event B had to occur 4 to 6 times before event E occurred.

By determining the correct sequence of events, the characteristics of the data records can be inferred from the CEP analysis and the query 400 described in FIG. 4. For example, a content provider (e.g., a provider that provides sponsored content items such as advertisements) may search for common characteristics of target audience based on past behaviors of customers at an online store. Specifically, a content provider may want to find out what common characteristics of the target audience may have based on the purchase records of female customers in the age between 20 and 25 and who performed additional product browsing or visited a promotional page after adding an item to cart. By using a query described in FIG. 4, the search module 230 performs CEP analysis to look for event data records that fit the event sequence 620 or 640 and use keyword search described in FIGS. 4 and 5 to filter customers by age and gender. In returning the search result, the search module 230 may also include other attributes of users such as other interests and other demographic data and/or include metrics of the user data records. As a result, the content provider can determine other common characteristics of the target audience may have to define the target spec of the sponsored content item.

While the CEP analysis is described with an example that is associated with providing content items for target audience, it should be noted that the search module described here can be used for other different types of data and applications in other fields. For example, the CEP analysis can be used to analyze other event sequences such as news events, user post history, etc. Also, it should be noted that the data records may not necessarily be associated with users.

Adaptive Sampling

Figure 7A:
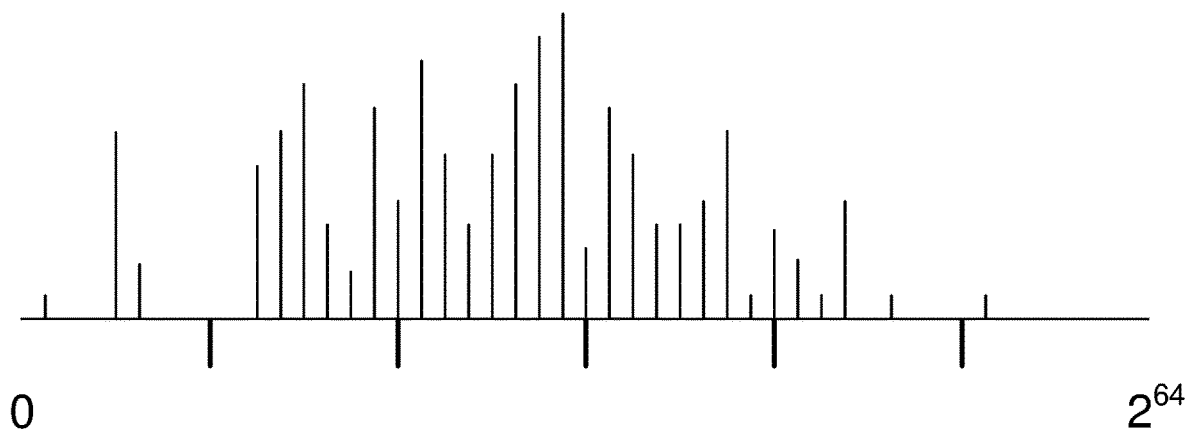
FIG. 7A illustrates an example distribution of user IDs of an online system.
Figure 7B:
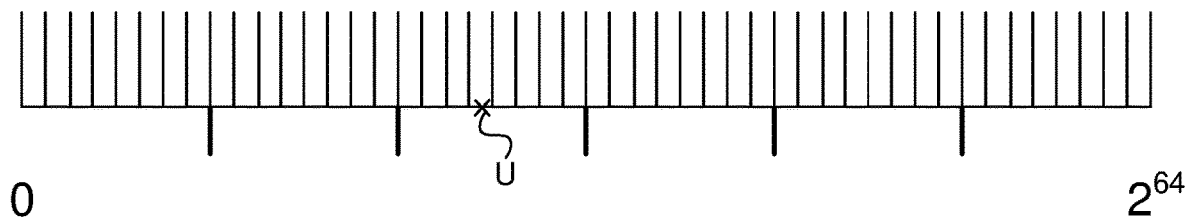
FIG. 7B illustrates an example distribution of hashes of the user ID shown in FIG. 7A.

FIGS. 7A and 7B illustrate a process of an adaptive sampling technique used in accordance with some embodiments. When the online system 140 is a large-scale system, there can be an extremely large amount of users associated with different user attributes. A keyword search that needs to screen through sometimes billions of data points can be very challenging. Hence, a sampling technique may be used.

FIG. 7A illustrates an example distribution of user IDs in numerical values in a possible range. The online system 140 has a unique user ID for each user account. The user IDs are strings and can be represented by integer values or in bits. Normally the online system 140 limits the maximum possible length of a user ID. For example, in the case shown in FIG. 7A, the largest possible integer values of a user ID is limited to 2^64, which represents 8 bytes. As shown in FIG. 7A, the distribution of the integer values of the numerical representation of the user ID is not uniform. This is because, from the perspective of the online system 140, what user IDs the online system 140 has is somewhat random because users may get whatever user IDs they like. As a result of this random distribution, a proper sampling of user data records based on user IDs becomes very challenging.

FIG. 7B illustrates a distribution of hashes, in accordance with an embodiment. The hashes are mapped from the user IDs and distribute the user IDs in a more uniform manner. Depending on the hash algorithm used, the hashes may or may not change the order of the user IDs. In one case, the user IDs are mapped to hashes that are uniformly distributed. For example, the hashes can be integer hashes that are generated by the integer values of the user IDs. An integer hash function accepts the integer values of the user IDs that are not uniformly distributed and maps the user IDs to integer hashes that are uniformly distributed. An example algorithm that is commonly referred to as Thomas Wang hash algorithm can be used to perform such generation of integer hashes, although other techniques are also possible. After the user IDs are mapped to more uniformly distributed hashes, the entire population of users can be sampled more unbiasedly. For example, the entire population of the hashes can be divided in certain numbers of intervals and samples are collected from each interval. Other sampling techniques may also be used.

It should be noted that the integer hashes in some cases are only substantially uniformly distributed but not strictly uniformly distributed. It is because the hashes take integer values and in some cases a strictly uniform distribution is not achievable. By way of a simple example, if the possible integer range of the hashes are between 1 and 100 while there are 59 user IDs, the integer hashes are not strictly uniformly distributed because 100 is not divisible by 59. A substantially uniform distribution here refers to a distribution of hashes having intervals with a number of hashes in each interval less than 5% variation, if the hashes are divided into ten intervals.

A sampling operation may first be performed to select a portion (e.g., 1%) of users in a population. After the user IDs are sampled through the hashes, the SQL command, CEP analysis, keyword searches, and join operations described in associated with the query 400 and the query plan 500 are performed to compute the number of data records or number of users that satisfy the conditions specified in a query. The sampled result is analyzed statistically to determine its margin of error in relative to the entire population. A confidence level of the sampling is computed based on the margin of error and is compared to a target confidence level (e.g., 95%). The confidence level represents the degree of confidence that the sampled data records correctly represents the population. The determination of the margin of error and the confidence level may be based on some statistical measures of the population, the sampled data records, and/or a subset of data records from the sampled data records that satisfy the keyword searches or SQL commands. The statistical measures may be metrics such as mean, variance, standard deviation and certain distributions, such as Gaussian distribution, may be assumed to determine the confidence level. The determined margin of error and confidence level may or may not reach the target level using the initial sampling. In response to the confidence level being lower than the target level, the query result can be used to determine how many additional samples are required to fetch in order to reduce the margin of error below the required level. Additional samples are then collected and the keyword searches and CEP analysis described in associated with the query 400 and the query plan 500 are repeated for the additional samples.

Improvement to Search Performance

The hashes may also be used to improve the speed of locating a user in accordance with some embodiments. As discussed in FIGS. 3A and 3B, user hashes are stored in inverted indexes of user attributes. Also, events data tables may be sorted by the values of the user hashes. When a keyword search that includes one or more Boolean operators is performed, user hashes that reside in different inverted indexes are combined based on the conditions specified by the Boolean operators. Such combination operation would require a cross reference of user IDs or user hashes. Using a conventional binary search to look up a user ID from one list to another list are not optimal for CPU cache, which could significantly slow down the search process when the number of data is in the order of magnitude of billions. Hence, user hashes are used in inverted indexes and event data tables to allow the combination of multiple arrays of data records to use a quick lookup technique described here.

By way of a specific example, referring to FIGS. 3A and 3B, a query may specify females who are interested in cars. In response to this query, the search module 230 identifies a first array 310 associated with the attribute "Female" having user hashes "256," "260," "262," "264" etc. The search module 230 also identifies a second array 320 associated with "interested in cars" having user hashes "256", "262," "281," "345" etc. The search module then determines whether "256", "262," "281," "345" in the second array 320 are females by searching through the user hashes in the first array 310. While such identification of user hashes in the first array appears to be a simple task when the example arrays 310 and 320 only show a handful of user hashes, the task with a huge amount of users (e.g., billions of users) in each set can in fact be time consuming because a conventional binary search to locate the correct user hashes is not an optimal use of CPU cache, especially the CPU might have to constantly scan through data one by one for each user.

In accordance with some embodiments, a pace calculation is used to speed up the identification and locating process of a user hash in an array in order to speed up the overall cross-referencing process. The user hash arrays (e.g. arrays 310 and 320) are sorted by the hashes' integer values. Since the hashes are substantially uniformly distributed, the integer value of the hash represents the location of the hash in the possible range of integer values of the hashes. For example, a hash with the value U as shown in FIG. 7B is located at $U/(2^{64})$. When an array of user hashes are analyzed, a pace is calculated using the maximum possible integer value of the hashes divided by the number of data records N in the array. In the case of FIG. 7B, the pace is equal to $(2^{64})/N$. Since the set of data records is also sorted by the integer values of the hashes, an estimated location of a particular user hash is computed using U divided by the pace. Then the exact user hash is located through forward and/or backward search from the estimated location. Using a simplified example, assume the range of the integer hash values is from 1 to 1000. There are 100 user hashes in an array of data records. The pace in this case is 10. A user ID with the hash value 562 will have an estimated location of 56 in the array. This pace calculation provides a significantly faster speed in locating a user hash in an inverted index list. The pace calculation can speed up the computer calculation by multiple order of magnitude.

Alternatively, the hashes can be grouped in N buckets with each bucket having roughly the same numbers of hashes. The hash value U represents the cumulative location of the hash in the overall population. The location of U can be quickly located based on the buckets.

It should be noted that the joining of user data records and event data records can also be achieved using the pace calculation operation because the event data tables can also be associated with and sorted by user hashes. As such, the speed of identification of data of the entire query operation can be improved by using the techniques such as pace calculation as described above.

Figure 8:
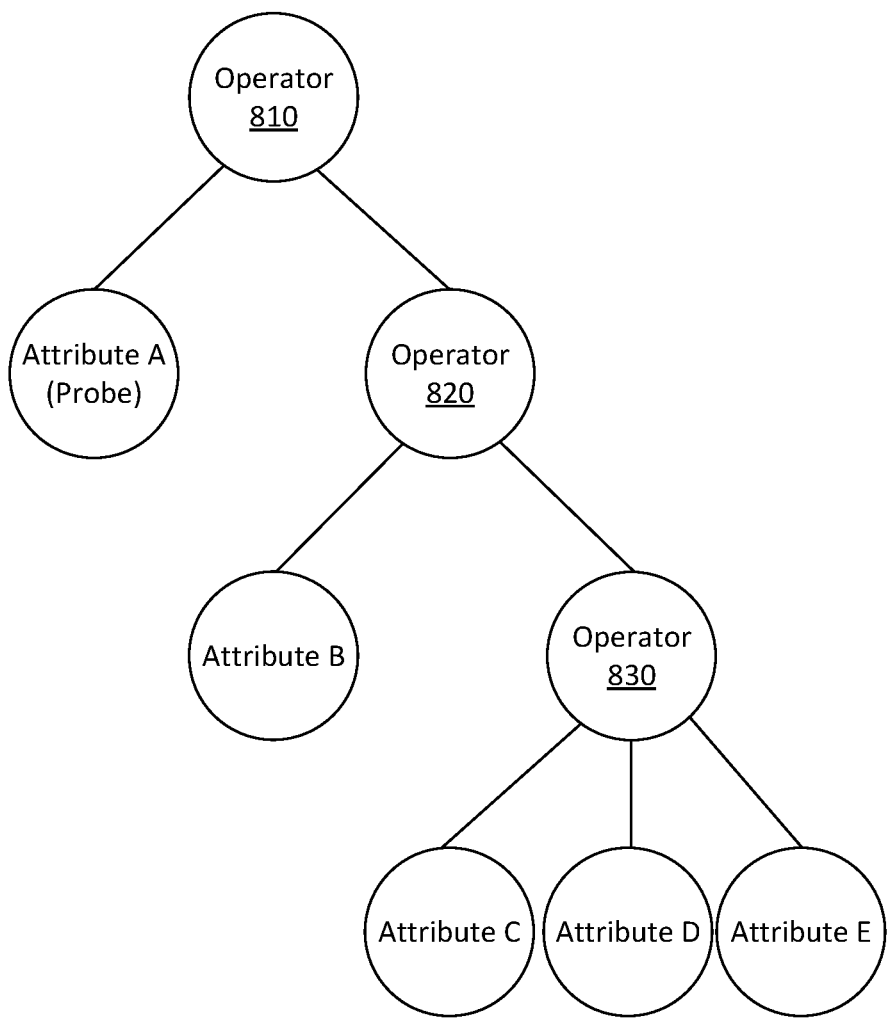
FIG. 8 is a block diagram illustrating a sequence of Boolean operations, in accordance with an embodiment.

FIG. 8 illustrates a search sequence in accordance with some embodiments. The operators 810, 820, and 830 are Boolean operators such as "and", "or", "not", "xor", "difference", and the like. In response to a query, the search module 230 arranges the Boolean operators (e.g., those specified in the keyword search) based on numbers of conditions to be tested by the Booleans operators. For example, meeting the conditions of the operator 830 alone does not satisfy the entire query. The operator 830 represents a sub-condition of the operator 820, which in turn is a sub-condition of the operator 810. The search sequence is arranged such that the condition on one side of the operator 810 is determined first by testing whether a data record meets attribute A first. In other words, attribute A is used as a probe of the entire Boolean operations. When a data record fails to meet attribute A conditioned by the operator 810, the search module 230 terminates the Boolean operations and moves on to another data record. This way the Boolean operations are sped up by selecting a probe that is one of the Boolean operators with the least numbers of conditions to be tested.

Search Method

Figure 9:
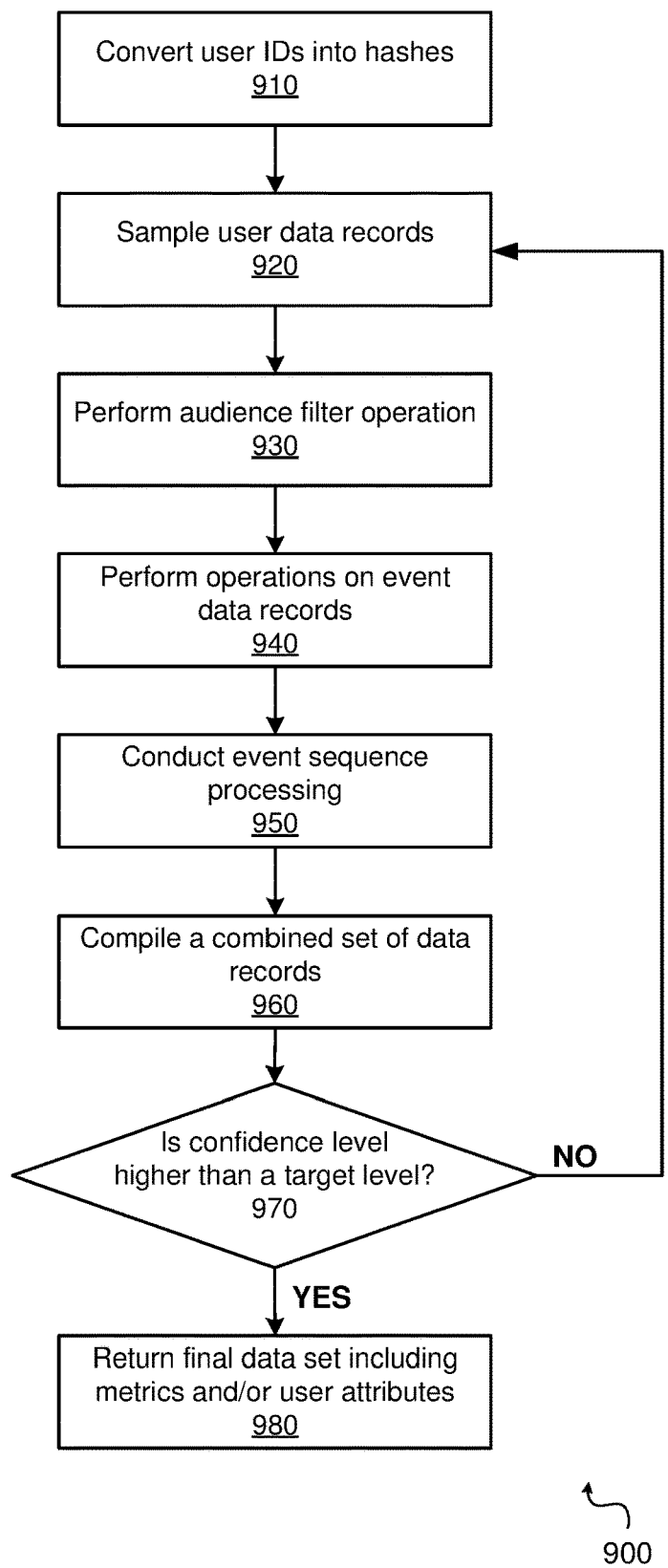
FIG. 9 is a flowchart illustrating a search method, in accordance with an embodiment.

FIG. 9 is a flowchart 900 illustrating a search method performed by the search module 230 in accordance with some embodiments. In 910, the users IDs are converted into hashes that are more uniformly distributed than the user IDs. The search module 230 may receive a query that specifies one or more conditions of user attributes and event sequences. In 920, the search module 230 samples user data records based on the distribution of the hashes. In 930, the search module 230 performs a keyword search for audience filter specified in the query to collect a subset of user data records from the sampled user data records. The keywords and Boolean operators associated with the keywords determine whether a sampled user data records have one or more attributes that satisfy the specified conditions in the query. In 940, the search module 230 performs operations on event data records to identify and collect event data records that match events specified by the query. Each type of the event specified in the query may be drawn from a different event data source. In 950, the search module 230 conducts a CEP analysis to identify a subset of event data records that also satisfy the particular event sequences specified in the query. It should be noted that 930 may be performed before 940 or after 950. The search module 230 includes a query optimizer to decide which part of collection is executed first based on the size of the data. In 960, the search module 230 compiles a combined set of data records from the subset of user data records and the subset of event data records. For example, data records in both subsets that share the same users are selected in a join operation. In decision stage 970, the search module 230 determines a confidence level that the sampled data records correctly reflect the population. The confidence level is then compared to a target level. If the confidence level is lower than the target level, the search module may expand the sampling of the user data records and re-conduct the process 910-960. In 980, the search module 230 returns subset as the final data set including user attributes. Also, the result can be extrapolated to the entire population of the users. The result may be returned in a SQL table format that includes plurality of user attributes. The result may also be returned as metrics that statistically summarize certain attributes of the data records.

General

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
 receiving a query, the query included in a body of text written in a query language defined by a syntax of the query language, the body of text of the query specifying one or more conditions of one or more user attributes and at least one sequence specification, the sequence specification included in the body of text comprising a first event with a first event attribute, a second event with a second event attribute, and an order of the first event and the second event, the same body of text of the query further comprising an audience filter that includes the user attributes, the audience filter under the syntax specifying that the user attributes are applied to the sequence specification to filter the sequence specification by the user attributes;
 sampling user data records from a population;
 collecting a set of data records that satisfy the query, the collecting of the set of data records comprising:
  collecting event data records that include the first event that matches the first event attribute and the second event that matches the second event attribute,
  identifying event sequences that satisfy the order of the first event and the second event specified in the query, an event sequence comprising a first event data record of the first event and a second event data record of the second event occurred in the order specified by the sequence specification,
  examining, in the sampled user data records, user data records associated with the event sequences, wherein the user data records associated with the event sequences are records that indicate users in the user data records were involved the event data records in the event sequences,
  selecting, by the user attributes, a subset of user data records from the user data records associated with the event sequences,
  applying the audience filter to the event sequences to generate a subset of event sequences, the subset of event sequences having the event data records indicating the users in the subset of user data records were involved in the subset of event sequences, and
  compiling the set of data records from the subset of event sequences;
 determining a confidence level that the set of data records correctly represents the population;
 responsive to the confidence level being lower than a target level, sampling additional user data records and expanding the collecting of the set of data records;
 presenting one or more metrics of the set of data records as a result of the query.

2. The method of claim 1, wherein the sampling of the user data records from the population comprises:
 accessing hashes of user identifiers, where the hashes distributes the user identifiers,
 sampling a subset of the hashes, and
 identifying user data records associated with the subset of the hashes.

3. The method of claim 2, wherein the hashes are generated by taking integer values of the user identifiers and returning integer hashes that are distributed more uniformly than the integer values of the user identifiers.

4. The method of claim 1, wherein the compiling of the set of data records comprises:
 identifying a hash of a user identifier associated with one of the event data records in the subset of event sequences, the hash having a hash value,
 computing a pace of the hash by dividing a largest possible value of hashes by a number of user data records in the subset of user data records,
 computing an estimated position of the user identifier in the subset of user data records by dividing the hash value by the pace, and
 searching for the user identifier in the subset of user data records from the estimated position.

5. The method of claim 1, wherein selecting, by the user attributes, the subset of user data records from the user data records associated with the event sequences comprises performing of one or more keyword searches, performing the one or more keyword searches comprises:
  performing a first keyword search to identify a first array of user data records that satisfy a first user attribute specified in the query,
  performing a second keyword search to identify a second array of user data records that satisfy a second user attribute specified in the query, and
  forming a set of common user data records, wherein each of the common user data records in the set comprises a common user that is included in both the first array and the second array.

6. The method of claim 5, wherein the one or more keyword searches comprises Boolean operations that are defined by an arrangement of Boolean operators based on numbers of conditions to be tested by the Boolean operators.

7. The method of claim 6, wherein the Boolean operations begin with a probe that is selected from one of the Boolean operators with the least number of conditions to be tested.

8. The method of claim 1, wherein the body of text of the query comprises a relational-database command, an event sequence command, and a keyword filter.

9. The method of claim 1, wherein both the subset of user data records and the subset of event sequences store hashes of the user identifiers.

10. The method of claim 9, wherein both the subset of user data records and the subset of event sequences are sorted by values of the hashes.

11. A non-transitory computer readable storage medium configured to store program code, the program code comprising instructions that, when executed by a processor, cause the processor to:
  receive a query, the query included in a body of text written in a query language defined by a syntax of the query language, the body of text of the query specifying one or more conditions of one or more user attributes and at least one sequence specification, the sequence specification included in the body of text comprising a first event with a first event attribute, a second event with a second event attribute, and an order of the first event and the second event, the same body of text of the query further comprising an audience filter that includes the user attributes, the audience filter under the syntax specifying that the user attributes are applied to the sequence specification to filter the sequence specification by the user attributes;
  sample user data records from a population;
  collect a set of data records that satisfy the query, the collecting of the set of data records comprising:
    collect event data records that include the first event that matches the first event attribute and the second event that matches the second event attribute,
    identify event sequences that satisfy the order of the first event and the second event specified in the query, an event sequence comprising a first event data record of the first event and a second event data record of the second event occurred in the order specified by the sequence specification,
    examine, in the sampled user data records, user data records associated with the event sequences, wherein the user data records associated with the event sequences are records that indicate users in the user data records were involved the event data records in the event sequences,
    select, by the user attributes, a subset of user data records from the user data records associated with the event sequences,
    apply the audience filter to the event sequences to generate a subset of event sequences, the subset of event sequences having the event data records indicating the users in the subset of user data records were involved in the subset of event sequences, and compile the set of data records from the subset of event sequences;
  determine a confidence level that the set of data records correctly represents the population;
  responsive to the confidence level being lower than a target level, sampling additional user data records and expanding the collecting of the set of data records;
  present one or more metrics of the set of data records as a result of the query.

12. The non-transitory computer readable storage medium of claim 11, wherein the sample of the user data records from the population comprises:
  access hashes of user identifiers, where the hashes distributes the user identifiers,
  sample a subset of the hashes, and
  identify user data records associated with the subset of the hashes.

13. The non-transitory computer readable storage medium of claim 12, wherein the hashes are generated by taking integer values of the user identifiers and returning integer hashes that are distributed more uniformly than the integer values of the user identifiers.

14. The non-transitory computer readable storage medium of claim 11, wherein the instruction to compile the set of data records comprises instructions, when execute, cause the processor to:
  identify a hash of a user identifier associated with one of the event data records in the subset of event sequences, the hash having a hash value,
  compute a pace of the hash by dividing a largest possible value of hashes by a number of user data records in the subset of user data records,
  compute an estimated position of the user identifier in the subset of user data records by dividing the hash value by the pace, and
  search for the user identifier in the subset of user data records from the estimated position.

15. The non-transitory computer readable storage medium of claim 11, wherein the instruction to select, by the user attributes, the subset of user data records from the user data records associated with the event sequences comprises instructions to perform of the one or more keyword searches, the instructions to performing the one or more keyword searches, when executed by the processor, cause the processor to:
  perform a first keyword search to identify a first array of user data records that satisfy a first user attribute specified in the query,
  perform a second keyword search to identify a second array of user data records that satisfy a second user attribute specified in the query, and
  form a set of common user data records, wherein each of the common user data records in the set comprises a common user that is included in both the first array and the second array.

16. The non-transitory computer readable storage medium of claim 15, wherein the one or more keyword searches comprises Boolean operations that are defined by an arrangement of Boolean operators based on numbers of conditions to be tested by the Boolean operators.

17. The non-transitory computer readable storage medium of claim 16, wherein the Boolean operations begin with a probe that is selected from one of the Boolean operators with the least number of conditions to be tested.

18. The non-transitory computer readable storage medium of claim 11, wherein the body of text of the query comprises a relational-database command, an event sequence command, and a keyword filter.

19. The non-transitory computer readable storage medium of claim 11, wherein both the subset of user sequences and the subset of event data records store hashes of the user identifiers.

20. The non-transitory computer readable storage medium of claim 19, wherein both the subset of user sequences and the subset of event data records are sorted by values of the hashes.

\* \* \* \* \*